(12) United States Patent
Manasse et al.

(10) Patent No.: US 8,594,239 B2
(45) Date of Patent: Nov. 26, 2013

(54) ESTIMATING DOCUMENT SIMILARITY USING BIT-STRINGS

(75) Inventors: Mark S. Manasse, San Francisco, CA (US); Arnd Christian König, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 13/031,265

(22) Filed: Feb. 21, 2011

(65) Prior Publication Data

US 2012/0213313 A1 Aug. 23, 2012

(51) Int. Cl.
*H04L 27/00* (2006.01)

(52) U.S. Cl.
USPC ........................................ 375/316

(58) Field of Classification Search
USPC ............... 375/316, 340; 707/692, 758
See application file for complete search history.

(56) References Cited

U.S. PATENT DOCUMENTS

| | | | |
|---|---|---|---|
| 7,158,961 B1 | 1/2007 | Charikar | |
| 7,603,370 B2 | 10/2009 | Manasse | |
| 7,707,157 B1 | 4/2010 | Shen | |
| 8,015,162 B2 * | 9/2011 | Henzinger | 707/692 |
| 8,185,532 B2 * | 5/2012 | Tsai et al. | 707/737 |
| 2008/0235201 A1 | 9/2008 | McSherry et al. | |
| 2009/0132571 A1 | 5/2009 | Manasse et al. | |
| 2010/0070511 A1 | 3/2010 | Manasse et al. | |
| 2012/0290597 A1 * | 11/2012 | Henzinger | 707/758 |

OTHER PUBLICATIONS

Manasse, et al., "Consistent Weighted Sampling", Retrieved at << http://research.microsoft.com/pubs/132309/ConsistentWeighted Sampling2.pdf >>, Jul. 2, 2008, pp. 12.

Lee, et al., "Partition Min-Hash for Partial Duplicate Image Discovery", Retrieved at << http://www.cs.cmu.edu/~dclee/pub/eccv10lee.pdf >>, Proceedings of the 11th European conference on Computer vision: Part I, Oct. 20, 2010 pp. 14.

Li, et al., "b-Bit Minwise Hashing", Retrieved at << http://research.microsoft.com/pubs/120078/wfc0398-liPS.pdf >>, The 19th International World Wide Web Conference, Apr. 26-30, 2010, pp. 10.

Charles, et al., "Efficient Weighted Consistent Sampling", U.S. Appl. No. 12/019,621, filed Jan. 24, 2008, pp. 25.

* cited by examiner

*Primary Examiner* — Khanh C Tran

(74) *Attorney, Agent, or Firm* — Microsoft Corporation

(57) ABSTRACT

Each of a plurality of documents is divided into samples. Small bit-strings are generated for selected samples from each of the documents and used to create a sketch for each document. Because the bit-strings are small (e.g., only one, two, or three bits in length), the generated sketches are smaller than the sketches generated using previous methods for generating sketches, and therefore use less storage space. The generated sketches are compared to determine documents that are near-duplicates of one another.

20 Claims, 5 Drawing Sheets

ESTIMATING DOCUMENT SIMILARITY USING BIT-STRINGS

BACKGROUND

Large collections of documents typically include many documents that are identical or nearly identical to one another. Determining whether two digitally-encoded documents are bit-for-bit identical is straightforward, using hashing techniques for example. Quickly identifying documents that are roughly or effectively identical, however, is a more challenging and, in many contexts, a more useful task.

The World Wide Web is an extremely large set of documents, and has grown exponentially since its birth. Web indices currently include approximately five billion to 120 billion web pages, up to a third of which may be duplicates or near-duplicates. Applications such as web crawlers and search engines benefit from the capacity to efficiently detect many near-duplicates.

SUMMARY

Each of a plurality of documents is divided into samples. Small bit-strings are generated for selected samples from each of the documents and used to create a sketch for each document. Because the bit-strings are small (e.g., only one, two, or three bits in length), the generated sketches are smaller than the sketches generated using previous methods for generating sketches, and therefore use less storage space. The generated sketches are compared to determine documents that are near-duplicates of one another.

In an implementation, a set of samples is received at a computing device. The set of samples is associated with a document. For each sample, a sequence of bits is generated until a predetermined bit value is generated by the computing device. A subset of samples from the set of samples is selected based on a length of each sequence of bits by the computing device. For each sample in the subset of samples, a bit-string is generated for the sample. The generated bit-string for each sample in the subset is used to estimate the similarity of the document to one or more other documents.

In an implementation, a first set of samples and a second set of samples are received at a computing device. The first set of samples is associated with a first document and the second set of samples is associated with a second document. A first plurality of bit-strings is generated based on the first set of samples by the computing device. A second plurality of bit-strings is generated based on the second set of samples by the computing device. A similarity between the first document and the second document is estimated based on the first and second plurality of bit-strings.

This summary is provided to introduce a selection of concepts in a simplified form that are further described below in the detailed description. This summary is not intended to identify key or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
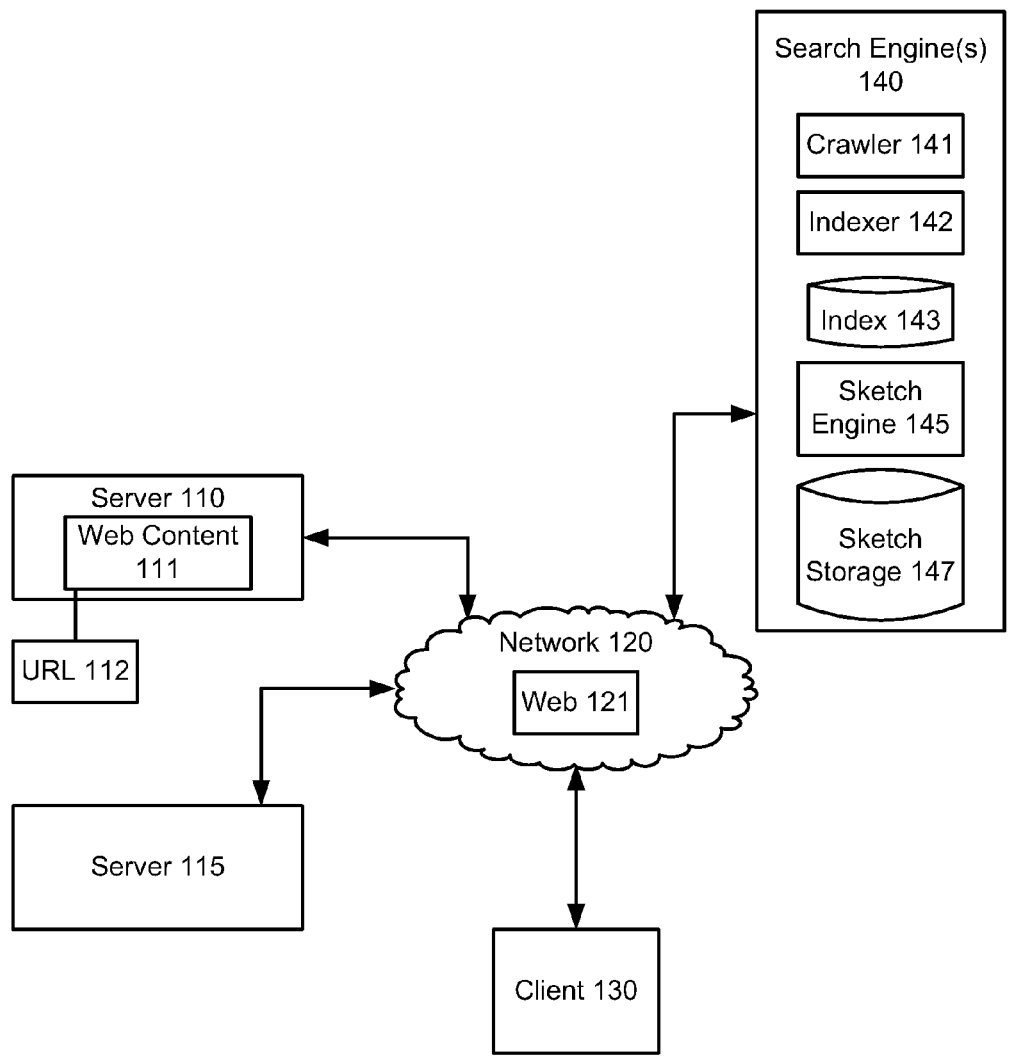
FIG. 1 is a block diagram of a distributed computer system.

FIG. 1 shows an arrangement 100 of a distributed computing system. A plurality of server computers (referred to as servers) 110, 115 are connected to each other by a communications network 120, for example, the Internet. The Internet includes an application level interface called the World Wide Web (web 121). The servers maintain web content 111, which may comprise, for example, multimedia content such as web pages. The location of web content 111 is specified by its uniform resource locator (URL) address 112. Although only two servers 110, 115 are shown, any number of servers may be connected to the network 120 and to each other.

A client computer (referred to as a client) 130 may also be connected to the network 120. Although only one client 130 is shown, any number of clients may be connected to the network 120. An example client 130 is described in with respect to FIG. 5. Usually, the client 130 is equipped with a web browser. During operation of the arrangement 100, a user of the client 130 may monitor the web content 111 of the servers. The user may want to monitor specific content that has changed in a substantial way.

In order to assist the user of the client 130 to locate web content 111, one or more search engines 140 are also connected to the network 120. A search engine 140 may use a crawler 141 to periodically scan the web 121 for changed or new content. An indexer 142 may maintain an index 143 of content located by the search engine. The search engine 140 may also be equipped with a query interface to process queries submitted by users to quickly locate indexed content. A user of the client 130 may interact with the query interface via a web browser.

In systems like a large web index, a sketch of each document may be generated and/or maintained by a sketch engine 145. For example, the content of complex documents expressed as many thousands of bytes can be reduced to a sketch of just dozens of bytes. The sketch is constructed by the sketch engine 145 so that the resemblance of two documents can be approximated from the sketches of the documents with no need to refer to the original documents. The generated sketches of the documents may be stored and maintained by the sketch engine 145 in a sketch storage 147.

Figure 2:
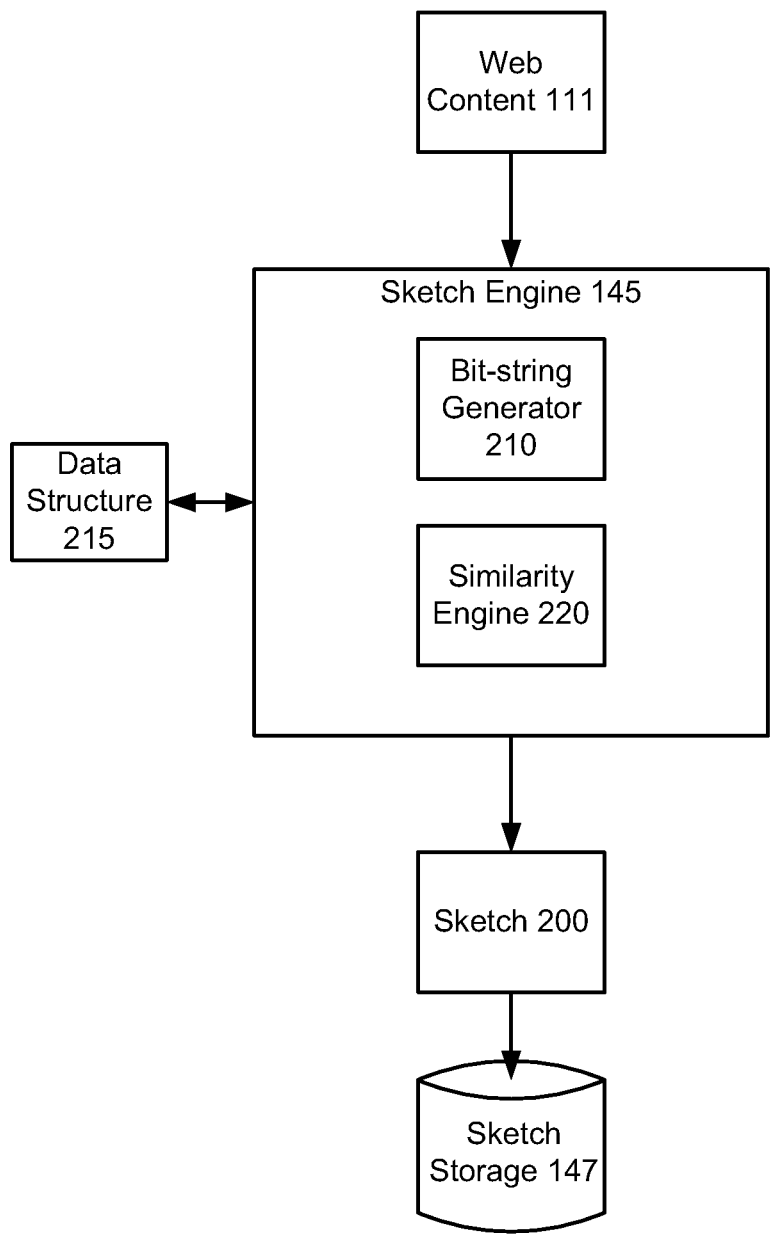
FIG. 2 is a block diagram of an implementation of a sketch engine.

FIG. 2 is a block diagram of an implementation of a sketch engine 145. The sketch engine 145 may generate a sketch 200 of each document of the web content 111 that is retrieved and indexed by the search engine 140. In some implementations, a sketch 200 may comprise a plurality of bit-strings. The sketch 200 may be stored in the sketch storage 147. The sketches for documents can be determined in isolation in a time which is directly proportional to the size of the documents. The sketches generated for documents can be used to estimate the similarity of the corresponding documents, and to determine whether the documents are near-duplicates based on the estimation. Thus, by using the sketches rather than the documents themselves to determine near-duplicate documents, the amount of storage resources needed for near-duplicate document determination is reduced.

Documents may have a high similarity (e.g., are near-duplicates) when they have the same content, except for minor differences such as formatting, corrections, capitalization, web-master signature, logos, etc. The sketches may be used to estimate a measure of the similarity between two documents be determining the intersection of the sketches associated with the documents. One way of doing this is to take samples from the document using a technique with the property that similar documents are likely to yield similar samples.

Accordingly, in an implementation, the sketch engine 145 may receive a document from the search engine 140, and may extract a set of N samples from the document, where each sample may correspond to a term, or sequence of bits, from the document. The size of N may be dependent on the size of the document.

The sketch engine 145 may include a bit-string generator 210. The bit-string generator 210 may select a subset of samples from the set of N samples, and may generate a plurality of bit-strings corresponding to each of the samples from the selected set of samples. The set of generated bit-strings for a document may be associated with the document and stored in the sketch storage 147 as the sketch 200 for the document. In some implementations, each generated bit-string may be small. For example, the generated bit-strings may be one, two, or three bits in length. However, other sized bit-strings may be supported.

The bit-string generator 210 may select K samples for the subset of samples from the set of N samples. Each selected sample may correspond to a slot of the sketch 200. In some implementations, the bit-string generator 210 may select a sample for the subset by, for each sample in the set of N samples, generating a sequence of bits for each slot until a predetermined bit is generated. For example, where the predetermined bit is a bit with a value of one, the search engine 140 may generate a sequence of bits until a bit with a value of one is generated.

After generating a sequence of bits for a slot, the bit-string generator 210 may compare the length of the generated sequence of bits with a length of the largest sequence of bits generated for that slot thus far. If the length of the generated sequence of bits for the slot is greater than the length of the generated sequence of bits previously generated for the slot, an indicator of the sample associated with the greater length sequence of bits may be recorded for the slot.

The bit-string generator 210 may generate each bit in a generated sequence of bits by flipping what is known as an unbiased coin. Unbiased coins are well known. In probability theory and statistics, a sequence of independent Bernoulli trials with probability ½ of success on each trial is called an unbiased coin. A sequence of independent Bernoulli trails for which the probability is not ½ is called a biased coin. A "heads" of the unbiased coin may correspond to a bit-value of zero and a "tails" of the unbiased coin may correspond to a bit-value of one, or vice-versa.

The indicators of the samples with the generated sequence of bits for each slot so far may be recorded by the bit-string generator 210 in a data structure 215. The data structure 215 may include an entry for each of the available K slots. An indicator of the sample with the largest length sequence of bits for a slot may be recorded in the entry for that slot by the bit-string generator 210. By generating the samples bit by bit using a coin rather than generating the bits for each sample in its entirety, the overall number of bits that are generated to select the minimum length sample for each slot is reduced.

In some implementations, where a sample for a slot has a generated sequence of bits with a length that is equal or tied with the maximum generated length sequence of bits for the slot, the search engine 140 may record an indicator of the sample with the tying length sequence of bits. After the sequences of bits have been generated for each sample for each slot, the bit-string generator 210 may break the ties for each slot. For example, in some implementations, the bit-string generator 210 may break ties by flipping an unbiased coin for each tying sample until all coins but one coin results in a heads. Alternatively, the unbiased coins may be flipped until all coins but one coin results in a tails. The tying sample associated with the last remaining coin may be selected by the bit-string generator 210 as the sample for the slot. Other methods for breaking ties may be used.

Alternatively, the bit-string generator 210 may not break ties between generated sequences of bits for a particular sample. Rather, when a generated sequence of bits for a slot is tied with another generated bit-string, the bit-string generator 210 may record the parity of the generated bit-string for the tying sample. The recorded parity may indicate that there was a tie and may be stored by the bit-string generator 210 with an indicator of the tying sample.

After selecting the samples, the bit-string generator 210 may generate a bit-string for each of the selected samples for each of the K slots as indicated by the data structure 215. The generated bit-strings may be one bit, two bit, or three bit bit-strings. However, other size bit-strings may be generated. In some implementations, the bit-strings may be generated by the bit-string generator 210 using an unbiased coin. Alternatively or additionally, the bit-string generator 210 may generate a bit-string for a selected sample based on the position of the sample in the set of samples, or the parity of the generated sequence of bits for the sample, for example. The bit-strings may be generated such that a bit-string generated from the $k^{th}$ sample of a document A will be identical to the bit-string generated from the $k^{th}$ sample of document B, if the two samples are identical.

The generated bit-strings based on the selected samples from a document may be used by sketch engine 145 to generate the sketch 200 for the document. The generated sketch 200 may be stored by the sketch engine 145 in the sketch storage 147.

In some implementations, rather than generating sequences of bits for each sample by flipping biased coins, the generated sequence of bits may be generated by the bit-string generator 210 by first generating a large sequence of bits. The bit-generator 210 may then generate the sequence of bits for each sample by parsing the large sequence of bits into smaller sequences of bits based on predetermined bit values. For example, the bit-string generator 210 may parse the large sequence into a smaller sequence of bits for a sample every time a bit with a value of one is reached. Each bit-string starting with a one for each position may be expected to occur about 1 time in e for a sample. Accordingly, the bit-string generator 210 may then use a small expected number of bits to determine a comparison to lie to select the sequence of bits for the sample and may use the remainder of the bits in the large sequence of bits if the comparison fails.

In another implementation, the bit-string generator 210 may select K samples from a set of samples by flipping a strongly biased coin to determine if any generate string of bits starts with a one (i.e., flipping a tail). The coin may be strongly biased towards heads. If a heads is flipped, the bit-string generator 210 may consider the next sample. If a tails is flipped, the bit-string generator 210 may select the sample and may determine the next sample that begins with a one by continuing to flip the strongly biased coin. The bit-string generator 210 may continue flipping biased coins until K samples have been selected. The bit-string generator 210 may then generate the bit-strings for the selected samples.

The sketch engine 145 may further include a similarity engine 220. The similarity engine 220 may determine a similarity between two or more documents based on the similarity of the sketches associated with each document. The greater the similarity between two documents, the greater the likelihood that the documents are duplicate or near-duplicate documents. The search engine 140 may use the similarity engine 220 of the sketch engine 145 to determine documents from the index 143 that are duplicate or near-duplicate documents. The duplicate or near-duplicate documents may be removed from the index 143, or otherwise flagged by the search engine 140.

The similarity engine 220 may estimate the similarity between two documents. The similarity between two documents may be estimated by the similarity engine 220 using a variety of techniques including, but not limited to, estimating the Jaccard similarity coefficient of the documents, estimating the intersection of the documents, and estimating the 1-norm distance between the documents. However, other methods for estimating the similarity of documents may be used.

The similarity engine 220 may estimate the Jaccard similarity for the sketches associated with the two documents based on a number of the generated bit-strings from each sketch 200 that agree and a number of the generated bit-strings from each sketch 200 that disagree. A first bit-string agrees with a second bit-string if it is equal to the second bit-string, and the first bit-string disagrees with the second bit-string if it is not equal to the second bit-string.

The similarity engine 220 may estimate the Jaccard similarity for two sketches by maintaining a count for the number of bit-strings that agree and a number of bit-strings that disagree. The similarity engine 220 may compare the bit-strings from each sketch 200 position by position, and may increment the corresponding count depending on whether the bit-strings at the same position in the sketches agree or disagree. For example, the similarity engine 220 may compare the first bit-string in a first sketch 200 with the first bit-string in a second sketch 200, followed by the second bit-string in the first sketch 200 with the second bit-string in the second sketch 200, etc.

In some implementations, the similarity engine 220 may estimate the Jaccard similarity for two sketches using the counts of the number of bit-strings that agree and the number of bit-strings that disagree. Because the sketches are generated using bit-strings that are small (e.g., one, two, or three bits), the similarity engine 220 may overestimate the Jaccard similarity of the sketches. Accordingly, in some implementations the Jaccard similarity may be estimated using the formula (1) to account for the overestimation, where #agree is the count of the number of bit-strings that agree and #disagree is the count of the number of bit-strings that disagree and b is the number of bits in each generated bit-string:

$$\frac{\#agree}{\#agree + \#disagree} - \frac{\#disagree}{2^b(\#agree + \#disagree)} \quad (1)$$

In some implementations, the similarity engine 220 may further estimate the similarity of two documents by determining the 1-norm distance (i.e., the Manhattan distance) between the two documents using a determined 1-norm of each document and the determined Jaccard similarity of the two documents. The similarity engine 220 may calculate the 1-norm distance using the following formula (2) where L1(A-B) is the 1-norm distance of a document A and a document B, L1(A) and L1(B) are the 1-norms of the documents A and B respectively, and J(A,B) is the Jaccard similarity of the documents A and B:

$$L1(A - B) = (L1(A) + L1(B))\frac{1 - J(A, B)}{1 + J(A, B)} \quad (2)$$

Figure 3:
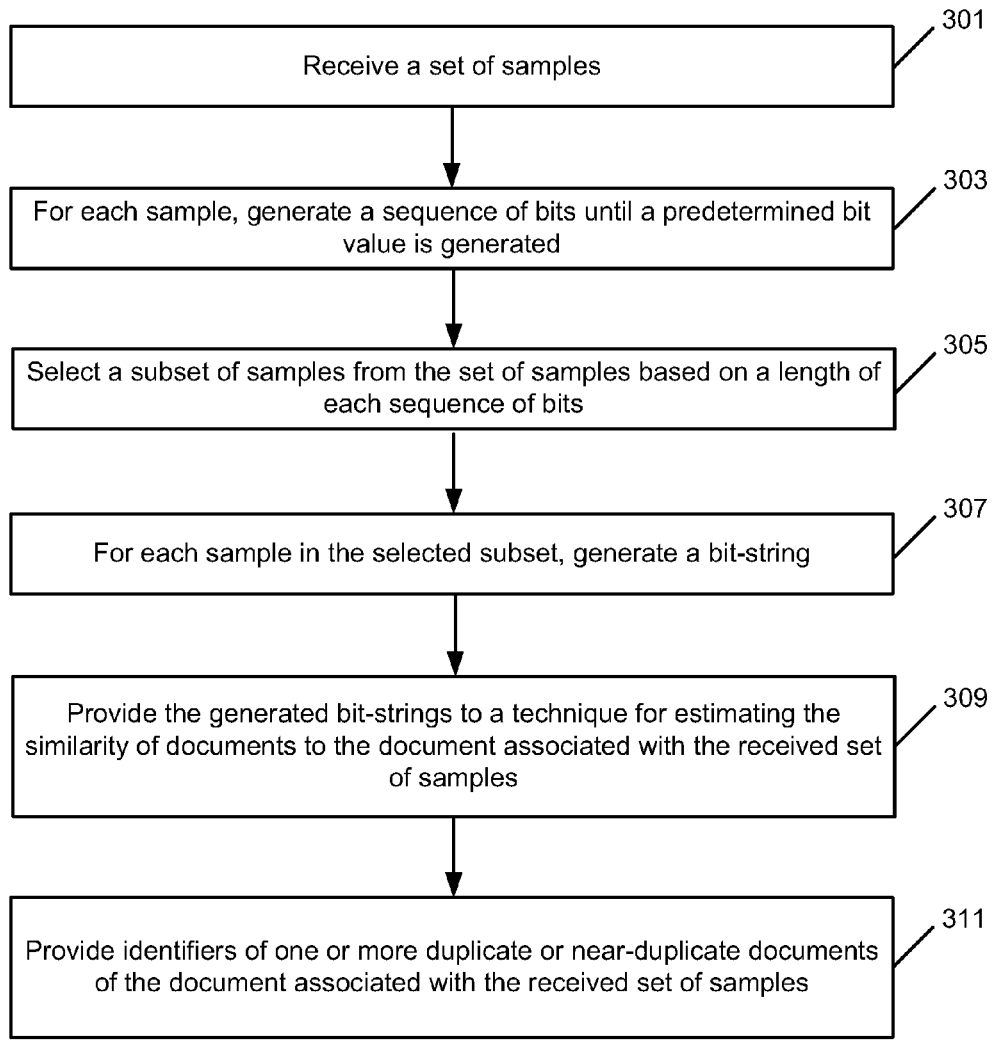
FIG. 3 is an operational flow of an implementation of a method of generating bit-strings for use in the estimation of the similarity of documents.

FIG. 3 is an operational flow of an implementation of a method 300 of generating bit-strings for use the in the estimation of the similarity of documents. The method 300 may be implemented by the sketch engine 145 of a search engine, for example.

A set of samples is received at 301. The set of samples may be received by the sketch engine 145. In some implementations, the samples may be taken from, or associated with, a document. The document may be part of web content 111 retrieved by a crawler 141 of the search engine 140 from a server 110, for example. Each sample in the set of samples may correspond to a term from the document.

For each sample, a sequence of bits is generated at 303. The sequence of bits may be generated by the bit-string generator 210 of the sketch engine 145. In some implementations, each sequence of bits may be generated by the bit-string generator 210 until a predetermined bit value, such as a one or a zero, is generated. For example, in some implementations, the bit-string generator 210 may generate bit-values using an unbiased coin. A "heads" may correspond to a bit-value of zero and a "tails" may correspond to a bit-value of one, or vice-versa. The bit-string generator 210 may generate a sequence of bits by flipping the unbiased coin until a tails is flipped.

In some implementations, the bit-string generator 210, for each sample, may generate a sequence of bits for each of K available slots. The slots may correspond to positions in a sketch 200. If the length of a generated sequence of bits (i.e., the number of bits that are generated before a zero value is generated) is greater than a length of a previously generated sequence of bits for the slot, then an indicator of the sample is recorded for the slot along with an indicator of the length. Where there is a tie between the length of the sequence of bits for a sample and the length of a previously generated sequence of bits, the tie may be broken by generating additional bits. Alternatively, the parity of the generated sequence of bits may be recorded for the slot. In some implementations, the indicators of samples, bit lengths, and parities may be stored in a data structure 215 associated with the set of samples.

A subset of samples is selected from the set of samples at 305. The subset of samples may be selected by the bit-string generator 210. The subset of samples may be selected from the set of samples by selecting the samples with associated sequence of bits having the greatest length. For example, the samples associated with the top K lengths may be selected for the subset. In implementations having a data structure 215 with indicators of each sample having the greatest length sequence of bits, the subset of samples may be selected according to the indicators stored for each slot.

For each sample in the selected subset, a bit-string is generated at 307. Each bit-string may be generated by the bit-string generator 210. The generated bit-strings may be small, and may each have a length of one, two, or three bits, for example. In some implementations, greater length bit-strings may be generated.

The generated bit-strings are provided for estimating the similarity of documents and the document associated with the received set of samples at 309. In some implementations, the similarity estimation may be an estimation of the Jaccard similarity coefficient.

Identifiers of one or more documents that are duplicates or near-duplicates of the document associated with the received set of samples are provided at 311. The identifiers may be provided by similarity engine 220 and may identify documents with estimated similarities that are above a threshold similarity. In an implementation, the identified duplicate or near-duplicate documents may be removed from an index (e.g., the index 143) or otherwise output to a user or administrator.

Figure 4:
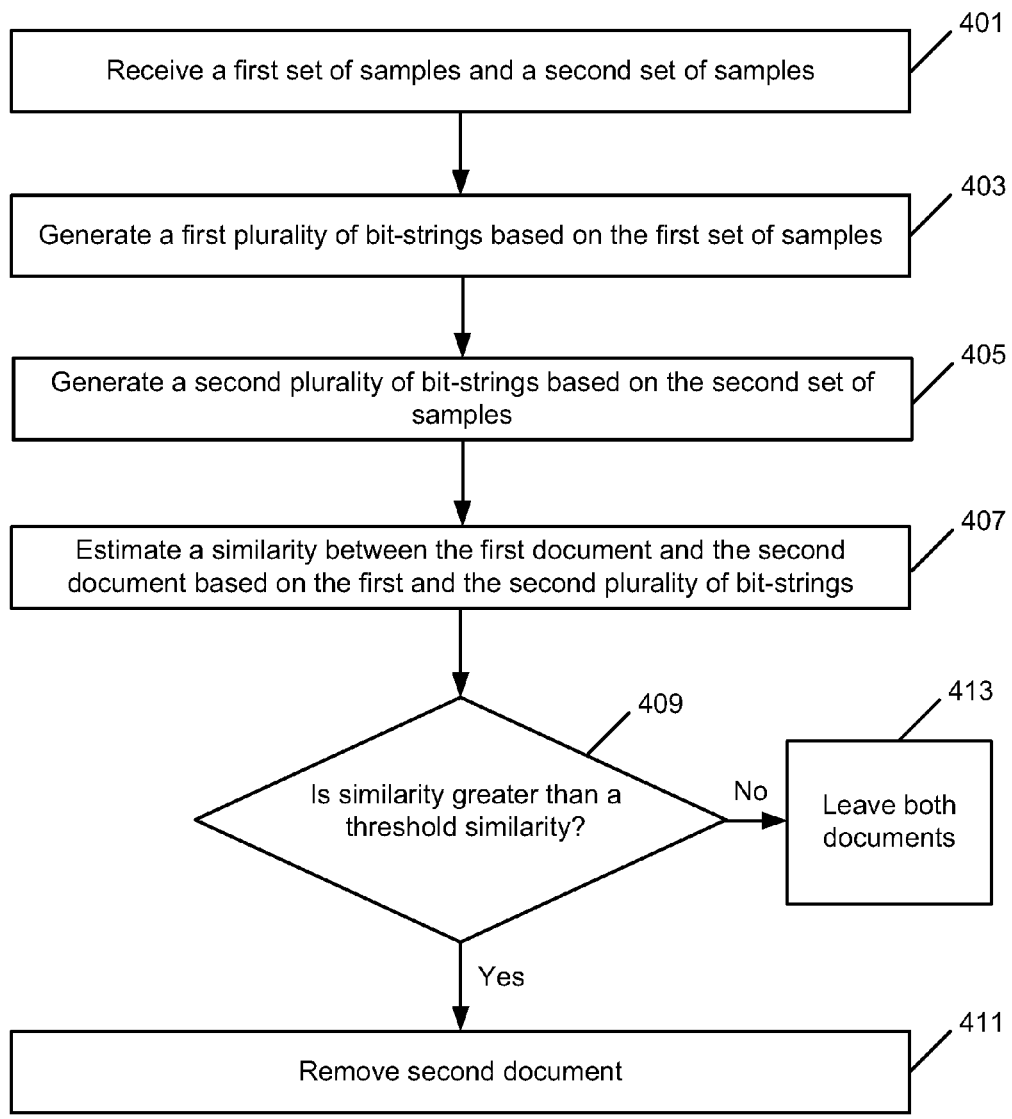
FIG. 4 is an operational flow of another implementation of a method for estimating the similarity of two documents.

FIG. 4 is an operational flow of an implementation of a method 400 for determining the similarity between two documents. The method 400 may be implemented by the sketch engine 145 of the search engine 140.

A first set of samples and a second set of samples are received at 401. The first set of samples and the second set of samples may be received by the sketch engine 145. In some implementations, the first set of samples may include terms associated with a first document, and the second set of samples may include terms associated with a second document.

A first plurality of bit-strings is generated based on the first plurality of samples at 403. The first plurality of bit-strings may be generated by the bit-string generator 210 based on the first plurality of samples. In some implementations, each bit-string may be a small bit-string and may be generated for selected samples from the first plurality of samples. The samples may be selected from the first plurality of samples by, for each sample, generating a sequence of bits until a predetermined bit, such as zero, is generated. The samples with the generated sequences of bits that have the greatest length may be selected.

A second plurality of bit-strings is generated based on the second set of samples at 405. The second plurality of bit-strings may be generated by the bit-string generator 210 similarly as described above for the first plurality of bit-strings.

A similarity between the first document and the second document is estimated based on the generated first and second plurality of bit-strings at 407. The similarity between the first and second documents may be determined by the similarity engine 220. In some implementations, the similarity between the first document and the second document may be determined by determining a first count of the number of bit-strings from the first plurality of bit-strings and the second plurality of bit-strings that agree, and a second count of the number of bit-strings from the first plurality of bit-strings and the second plurality of bit-strings that disagree.

A determination is made as to whether the estimated similarity is greater than a threshold similarity at 409. The determination may be made by the similarity engine 220. The threshold may be set by a user or administrator.

If the estimated similarity is greater than the threshold similarity, the first and second documents are duplicate or near-duplicate documents, and the second document may be removed at 411. For example, the second document may be removed from the index 143 by the similarity engine 220. Otherwise, the documents are not duplicate or near-duplicate documents, and both documents may be left in the index 143 by the similarity engine 220 at 413.

Figure 5:
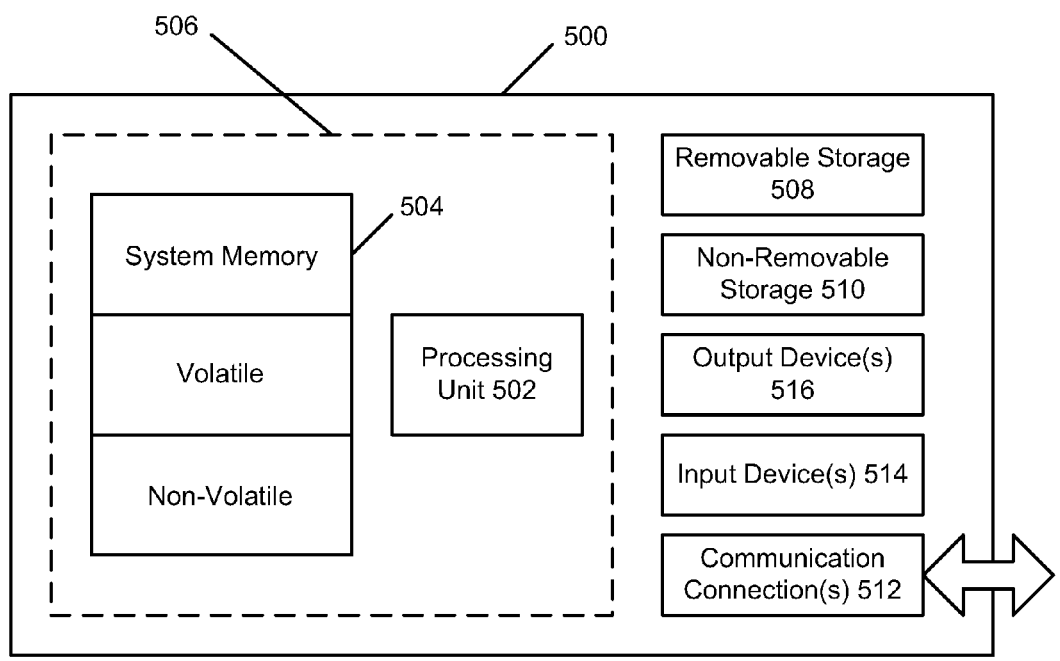
FIG. 5 shows an exemplary computing environment.

FIG. 5 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the computing device 500 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving a set of samples at a computing device, wherein the set of samples is associated with a document;
   for each sample, generating a sequence of bits until a predetermined bit value is generated, by the computing device;
   selecting a subset of samples from the set of samples based on a length of each sequence of bits, by the computing device;
   for each sample in the subset of samples, generating a bit-string for the sample by the computing device; and
   providing the generated bit-string for each sample in the subset for estimating the similarity of the document and another document by the computing device.

2. The method of claim 1, wherein each generated bit-string has a length of one bit, two bits, or three bits.

3. The method of claim 1, wherein generating the sequence of bits until the predetermined bit value is generated comprises generating the sequence of bits until a bit with a value of one is generated.

4. The method of claim 1, further comprising generating a data structure with a number of elements equal to the size of the selected subset, wherein each element comprises an indicator of a sample and a length, and further wherein generating the sequence of bits until the predetermined bit value is generated further comprises determining if the length of the generated sequence of bits is greater than the length associated with an element of the data structure, and if so, replacing the indicator of the sample of the element with an indicator of the sample corresponding to the generated bit-string.

5. The method of claim 4, further comprising determining if the length of the generated sequence of bits is equal to the length of the element of the data structure, and if so, recording a parity of the generated sequence of bits in the data structure.

6. The method of claim 1, wherein the estimated similarity is one of a Jaccard coefficient, an intersection of the document and the another document, or a 1-norm distance between the document and the another document.

7. A method comprising:
   receiving a first set of samples and a second set of samples at a computing device, wherein the first set of samples is associated with a first document and the second set of samples is associated with a second document;
   generating a first plurality of bit-strings based on the first set of samples by the computing device;
   generating a second plurality of bit-strings based on the second set of samples by the computing device; and
   estimating a similarity between the first document and the second document based on the first and second pluralities of bit-strings by the computing device, wherein each bit-string has an associated position, and estimating the similarity between the first document and the second document based on the first and second pluralities of bit sequences comprises:
      determining a first count of the number of bit-strings from the first and the second pluralities of bit-strings with the same associated position that agree;
      determining a second count of the number of bit-strings from the first and the second pluralities of bit-strings with the same associated position that disagree; and
      estimating the similarity between the first document and the second document based on the first count and the second count.

8. The method of claim 7, wherein each bit-string has a length of one bit, two bits, or three bits.

9. The method of claim 7, wherein the generating the first plurality of bit-strings comprises:
   for each sample in the first set of samples, generating a sequence of bits until a predetermined bit value is generated;
   selecting a subset of samples from the first set of samples based on a length of each sequence of bits;
   for each sample in the subset of samples, generating a bit-string for the sample; and
   adding the generated bit-strings to the first plurality of bit-strings.

10. The method of claim 9, wherein generating the sequence of bits until the predetermined bit value is generated comprises generating the sequence of bits until a bit with a value of one is generated.

11. The method of claim 7, further comprising estimating the similarity between the first document and the second document based on the first count, the second count, and based on a length of the bit-strings.

12. The method of claim 7, wherein the estimated similarity is one of a Jaccard coefficient, an intersection of the first document and the second document, or a 1-norm distance between the first document and the second document.

13. The method of claim 7, further comprising determining that the estimated similarity is greater than a threshold similarity.

14. The method of claim 13, further comprising, in response to determining that the estimated similarity is greater than the threshold similarity, determining that the first document and the second document are duplicate documents or near-duplicate documents.

15. A system comprising:
  at least one computing device;
  a bit-string generator adapted to:
    receive a first set of samples and a second set of samples, wherein the first set of samples is associated with a first document and the second set of samples is associated with a second document;
    generate a first plurality of bit-strings based on the first set of samples, wherein the bit-string generator adapted to generate the first plurality of bit-strings comprises the bit-string generator adapted to:
      for each sample in the first set of samples, generate a sequence of bits until a predetermined bit value is generated;
      select a subset of samples from the first set of samples based on a length of each sequence of bits;
      for each sample in the subset of samples, generate a bit-string for the sample; and
      add the generated bit-strings to the first plurality of bit-strings; and
    generate a second plurality of bit-strings based on the second set of samples; and
  a similarity engine adapted to estimate a similarity between the first document and the second document based on the first and second pluralities of bit-strings.

16. The system of claim 15, wherein each bit-string has a length of one bit, two bits, or three bits.

17. The system of claim 15, wherein the bit-string generator adapted to generate the sequence of bits until the predetermined bit value is generated comprises the bit-string generator adapted to generate the sequence of bits until a zero bit is generated.

18. The system of claim 15, wherein each bit-string has an associated position, and the similarity engine is adapted to:
  determine a first count of the number of bit-strings from the first and the second pluralities of bit-strings with the same associated position that agree;
  determine a second count of the number of bit-strings from the first and the second pluralities of bit-strings with the same associated position that disagree; and
  estimate a similarity between the first document and the second document based on the first count and the second count.

19. The system of claim 18, wherein the similarity engine is adapted to estimate the similarity between the first document and the second document based on the first count and the second count, and further based on a length of the bit-strings.

20. The system of claim 18, wherein the estimated similarity is one of a Jaccard coefficient, an intersection of the first document and the second document, or a 1-norm distance between the first document and the second document.

* * * * *